US011661338B2

(12) United States Patent
Severa et al.

(10) Patent No.: US 11,661,338 B2
(45) Date of Patent: May 30, 2023

(54) ACTIVATED MAGNESIUM BORIDE MATERIALS FOR HYDROGEN STORAGE

(71) Applicant: University of Hawaii, Honolulu, HI (US)

(72) Inventors: Godwin Severa, Honolulu, HI (US); Craig M. Jensen, Honolulu, HI (US); Cody Sugai, Honolulu, HI (US); Stephen Young-min Kim, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 274 days.

(21) Appl. No.: 16/648,661

(22) PCT Filed: Sep. 21, 2018

(86) PCT No.: PCT/US2018/052306
§ 371 (c)(1),
(2) Date: Mar. 18, 2020

(87) PCT Pub. No.: WO2019/060784
PCT Pub. Date: Mar. 28, 2019

(65) Prior Publication Data
US 2020/0270127 A1    Aug. 27, 2020

Related U.S. Application Data

(60) Provisional application No. 62/591,011, filed on Nov. 27, 2017, provisional application No. 62/561,649, filed on Sep. 21, 2017.

(51) Int. Cl.
*C01B 3/00* (2006.01)
*C01B 35/04* (2006.01)

(52) U.S. Cl.
CPC ............ *C01B 3/0026* (2013.01); *C01B 35/04* (2013.01)

(58) Field of Classification Search
CPC ......... C01B 3/0026; C01B 35/04; C01B 6/04; Y02E 60/32
See application file for complete search history.

(56) References Cited

U.S. PATENT DOCUMENTS 8,147,788 B1 * 4/2012 Ronnebro ............. C01B 3/0026
423/658.2
2002/0141939 A1 * 10/2002 Schulz .................. C01B 3/0005
423/658.2

(Continued)

FOREIGN PATENT DOCUMENTS

CN    102730639 A  * 10/2012
CN    102730639 A    10/2012

OTHER PUBLICATIONS

Vajo et al. "Reversible Storage of Hydrogen in Destabilized LiBH4" J. Phys. Chem. B, vol. 109, No. 9, p. 3719-3722 (Year: 2005).*

(Continued)

*Primary Examiner* — Steven J Bos
*Assistant Examiner* — Syed T Iqbal
(74) *Attorney, Agent, or Firm* — Snell & Wilmer L.L.P.

(57) ABSTRACT

Some embodiments described herein provide for methods for synthesizing magnesium borohydride from hydrogenation of magnesium boride at moderate temperature and pressure in the presence of a modifier. The modifier may be in form of hydrides, liquid hydrogen carriers, ammonia borane, metallic species, croconate anion based materials, ethers, amines or imines, metal carbides, borides, graphene, arenes, magnesium, aluminum, calcium or ionic liquids. Some embodiments provide for charging magnesium boride in presence of a modifier at high pressure hydrogen while simultaneously heating the material. The modification in (Continued)

Figure 1:
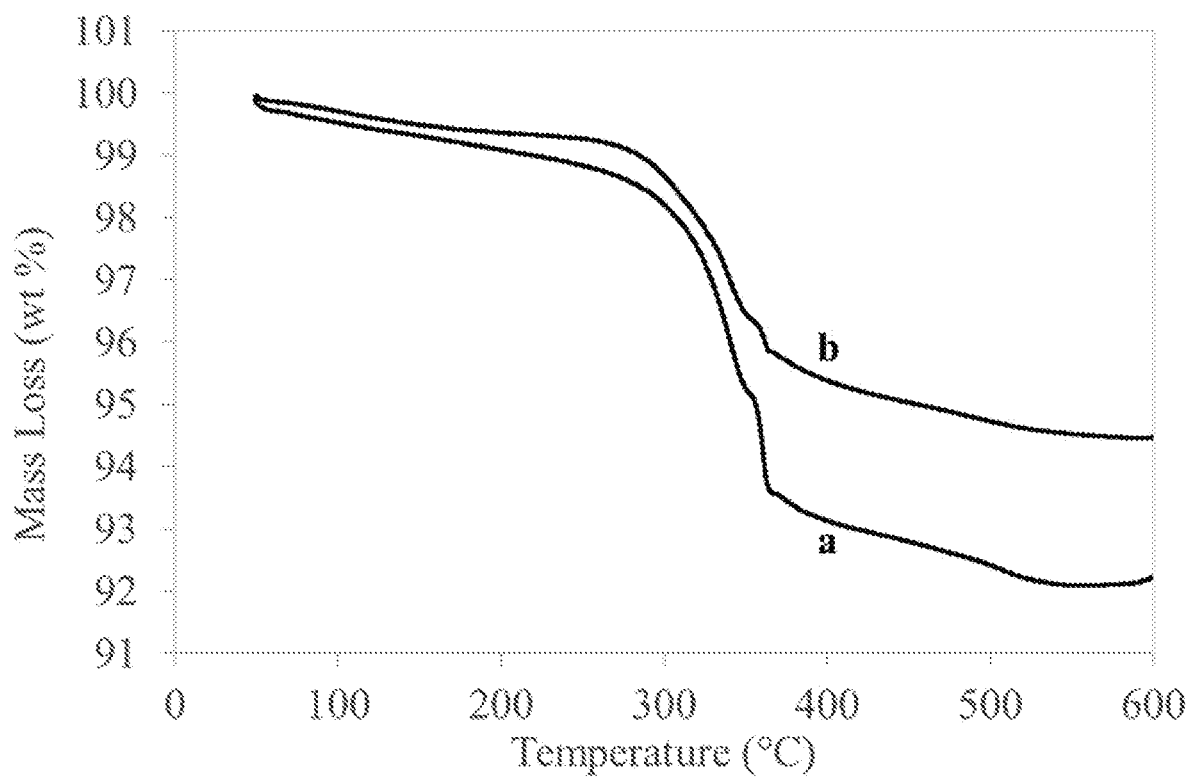

some instances may lead to an improved magnesium boride product with enhanced properties for application in other hydrogen storage systems.

19 Claims, 6 Drawing Sheets

(56) References Cited

U.S. PATENT DOCUMENTS

2008/0014136 A1    1/2008   Soloveichik et al.
2008/0075987 A1*   3/2008   Kindler ............ H01M 8/04201
                                                                429/513

OTHER PUBLICATIONS

International Search Report dated Jan. 18, 2019 for corresponding International Application No. PCT/US2018/052306 filed Sep. 21, 2018; total 3 pages.
Written Opinion of the International Searching Authority dated Jan. 18, 2019 for corresponding International Application No. PCT/US2018/052306 filed Sep. 21, 2018; total 7 pages.
International Preliminary Report on Patentability dated Mar. 24, 2020 for corresponding International Application No. PCT/US2018/052306 filed Sep. 21, 2018; total 8 pages.

* cited by examiner

ACTIVATED MAGNESIUM BORIDE MATERIALS FOR HYDROGEN STORAGE

CROSS-REFERENCE TO RELATED PATENT APPLICATION

The present application is a U.S. National Stage entry under 35 U.S.C. § 371 of International Application No. PCT/US2018/052306 filed Sep. 21, 2018, which application claims priority to, and the benefit of: U.S. Provisional Patent Application No. 62/591,011 filed on Nov. 27, 2017 entitled "ACTIVATED MAGNESIUM BORIDE MATERIALS: HYDROGEN STORAGE AND ELECTRONICS APPLICATIONS"; U.S. Provisional Patent Application No. 62/561,649 filed on Sep. 21, 2017 entitled "ACTIVATED MAGNESIUM BORIDE MATERIALS: HYDROGEN STORAGE AND ELECTRONICS APPLICATIONS". The contents of each of the foregoing applications are hereby incorporated by reference in their entirety for all purposes (except for any subject matter disclaimers or disavowals, and except to the extent that the incorporated material is inconsistent with the express disclosure herein, in which case the language in this disclosure controls).

STATEMENT REGARDING FEDERALLY SPONSORED RESEARCH OR DEVELOPMENT

This invention was made with government support under grant number DE-EE0007654 awarded by the Department of Energy. The government has certain rights in this application.

PARTIES TO A JOINT RESEARCH AGREEMENT

This invention claimed herein was made as a result of activities undertaken within the scope of a joint research agreement initiated by the United States Department of Energy and the University of Hawai'i at Manoa, and the Hydrogen Materials—Advanced Research Consortium (HvMARC).

TECHNICAL FIELD

The present disclosure relates generally to hydrogen storage materials. In particular, the disclosure relates to methods of forming an activated or improved boride or hydride material.

BACKGROUND

Hydrogen is a candidate for the next generation of energy carriers, which are needed to meet the challenges of global warming and finite fossil fuel-based energy resources. Hydrogen, when used in a fuel cell to provide electricity, is an emissions-free alternative fuel. Over the years, considerable attention has been given to the use of hydrogen as a fuel or fuel supplement. Hydrogen has the highest density of energy per unit weight of most, if not all, chemical fuels. However, the use of hydrogen as a source of energy has been hindered due to volumetric problems of storing hydrogen in gaseous or even liquid forms.

Magnesium borohydride, $Mg(BH_4)_2$, is one of the few materials with a gravimetric $H_2$ density (14.7 wt % $H_2$) that is sufficient to meet the requirements of practical on-board PEM fuel cell applications and also possesses thermodynamics ($\Delta H°=39$ kJ/mol $H_2$, $\Delta S=112$ J/K mol $H_2$) that permit reversible $H_2$ release. However, overcoming the extremely slow kinetics of the reversible release of hydrogen by this material is a daunting challenge. Other hydrides which have been extensively studied include aluminum hydride. Though aluminum hydride has shown to be a promising material, it has only been reversible through a chemical process rendering the regeneration process cost prohibitive. Calcium borohydrides have also been investigated but have not been viable commercially. Furthermore, $Mg(BH_4)_2$ has been formed directly from its decomposition product, $MgB_2$, using high pressure at 900 bars and temperatures greater than 400° C. Yet, high pressures and temperatures have made this process commercially undesirable.

SUMMARY

Methods of lowering the pressure and temperature of the synthesis of magnesium borohydride are disclosed herein. In a preferred embodiment, a method of producing a magnesium borohydride comprises: hydrogenating a quantity of a reaction mixture of magnesium boride, $MgB_2$, in the presence of a modifier, wherein the hydrogenation is performed at a temperature at or below 300° C. and at a hydrogenation pressure at or below 1000 bar.

In one aspect, a method of making hydrogen storage materials through modifications of magnesium boride is disclosed herein. The method comprises: milling magnesium boride in the presence of sub-stoichiometric amounts of at least one of an ether, arene, graphene, metal hydride, and metal in an inert atmosphere.

In one aspect, a method of powering a vehicle apparatus is disclosed herein. The method comprises: modifying magnesium boride through mechanically milling the magnesium boride in the presence of sub-stoichiometric amounts of at least one of an ether, arctic, graphene, metal hydride, and metal in an inert atmosphere such that the hydrogen storage material maintains a hydrogen cycling capacity of ≥4 wt %; controlling the release of hydrogen upon heating the modified magnesium boride in a hydrogen reservoir system; and powering a vehicle with the released hydrogen.

In one aspect, a method of producing magnesium borohydride from a modified or activated $MgB_2$ is disclosed herein. The method comprises: mixing magnesium boride with a modifier, mechanically mixing the modifier and the $MgB_2$ to form a compounded mixture; and hydrogenating the compounded mixture at or below 300° C. and at or below 700 bar.

In one aspect, a method of producing a magnesium borohydride capable of reversible hydrogenation is disclosed herein. The method comprises: mechanical, sonication or thermal mixing of magnesium boride with at least one modifier to form a compounded mixture; and hydrogenating the compounded mixture at or below 300° C. and at or below 700 bar.

In one aspect, a method of charging magnesium boride is disclosed herein. The method comprises: mixing magnesium boride with a modifier; applying high pressure hydrogen and heat to form a modified $MgB_2$; and using the modified $MgB_2$ in a hydrogen storage system.

The contents of this section are intended as a simplified introduction to the disclosure, and are not intended to limit the scope of any claim.

BRIEF DESCRIPTION OF THE DRAWING FIGURES

The drawings provided herein are for the purpose of facilitating the understanding of the certain embodiments of the present invention and are provided by way of illustration and not limitation on the scope of the appended claims.

FIG. 1 illustrates TGA of (a) $MgB_2$ modified with THF and 40 mol % Mg; and (b) $MgB_2$ modified with 40 mol % $MgH_2$, hydrogenated at 700 bar and 300° C. undergoing dehydrogenation.

Figure 2:
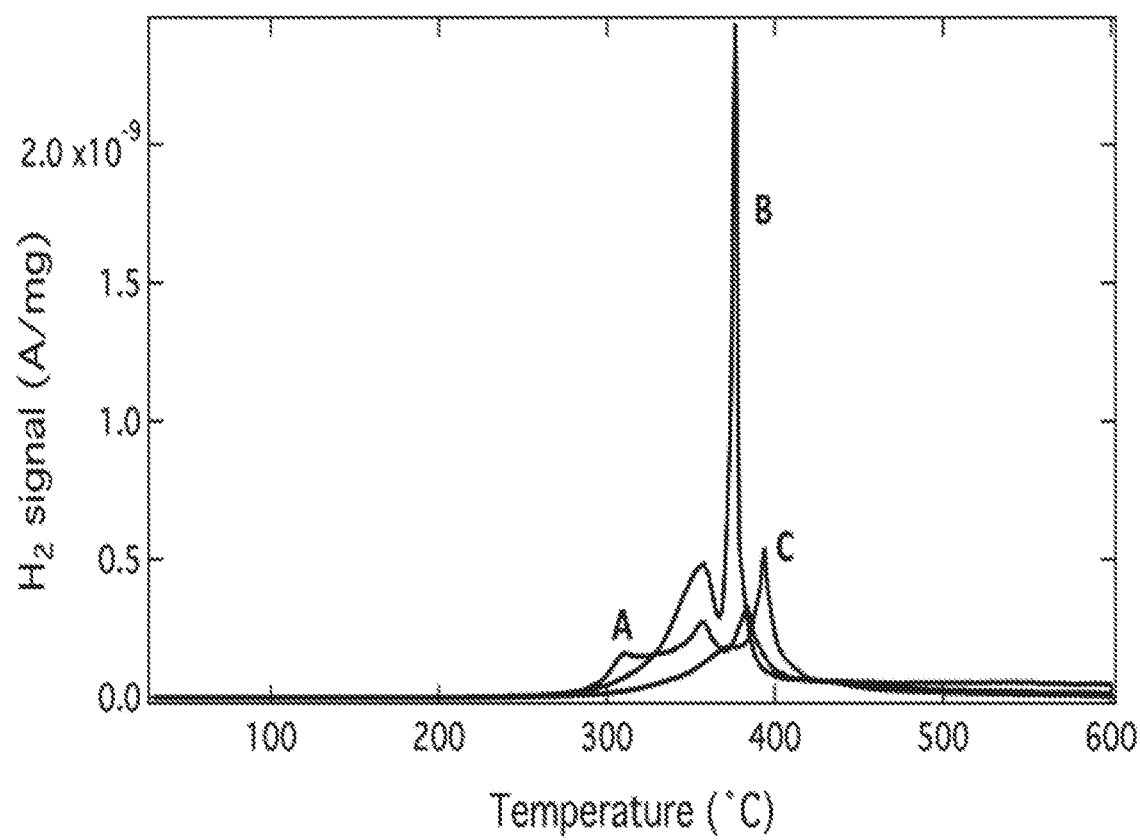

FIG. 2 illustrates TPD-Mass spectroscopy analyses of modified $MgB_2$ materials hydrogenated at 700 bar and 300° C. A—is $MgB_2$ modified with THF and 5 mol % Mg; B—is $MgB_2$ modified with THF and 40 mol % Mg; and C—is $MgB_2$ modified with 40 mol % $MgH_2$. Only negligible, trace amounts of impurities were detected in all samples.

Figure 3:
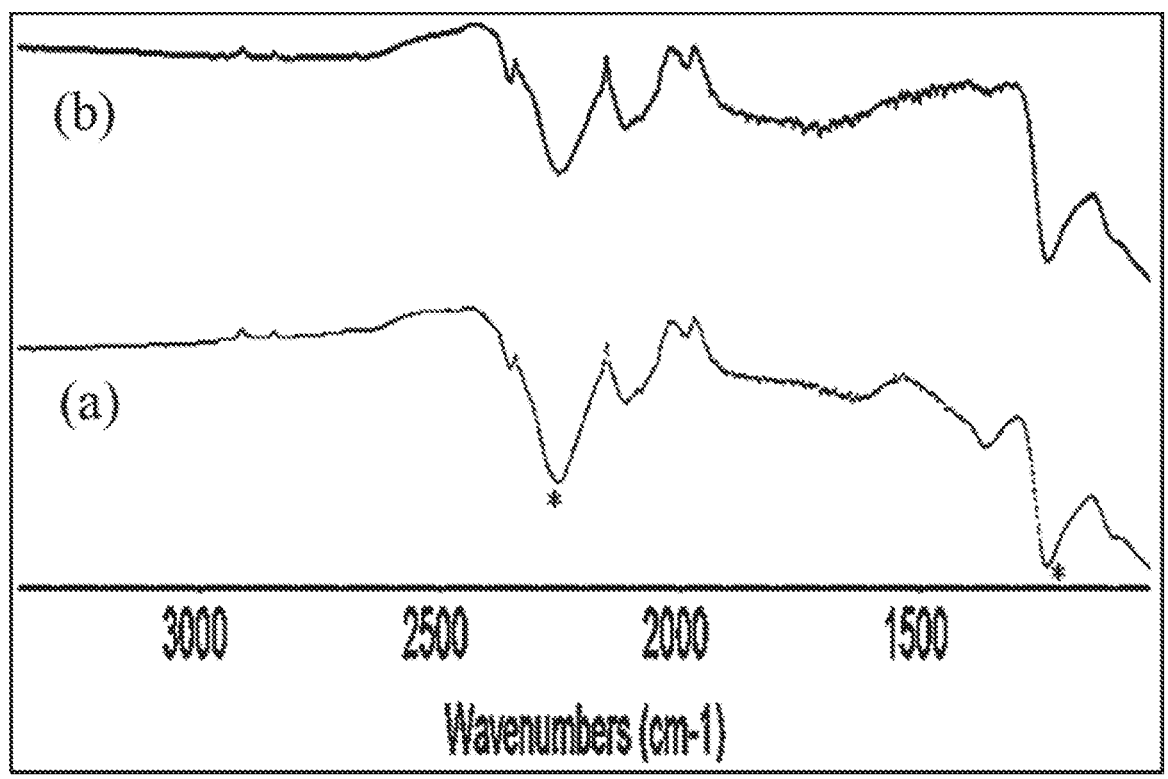

FIG. 3 illustrates FT-ATR of ball milled. (a)—is $MgB_2$ modified with 40 mol % $MgH_2$, and (b)—is $MgB_2$ modified with THF and 40 mol % Mg, hydrogenated at 700 bar, 300° C. for 72 hr. New intense vibrations (asterisked) in the 2200-2400 $cm^{-1}$ and 1200-1300 $cm^{-1}$ attributed to borohydride are observed.

Figure 4:
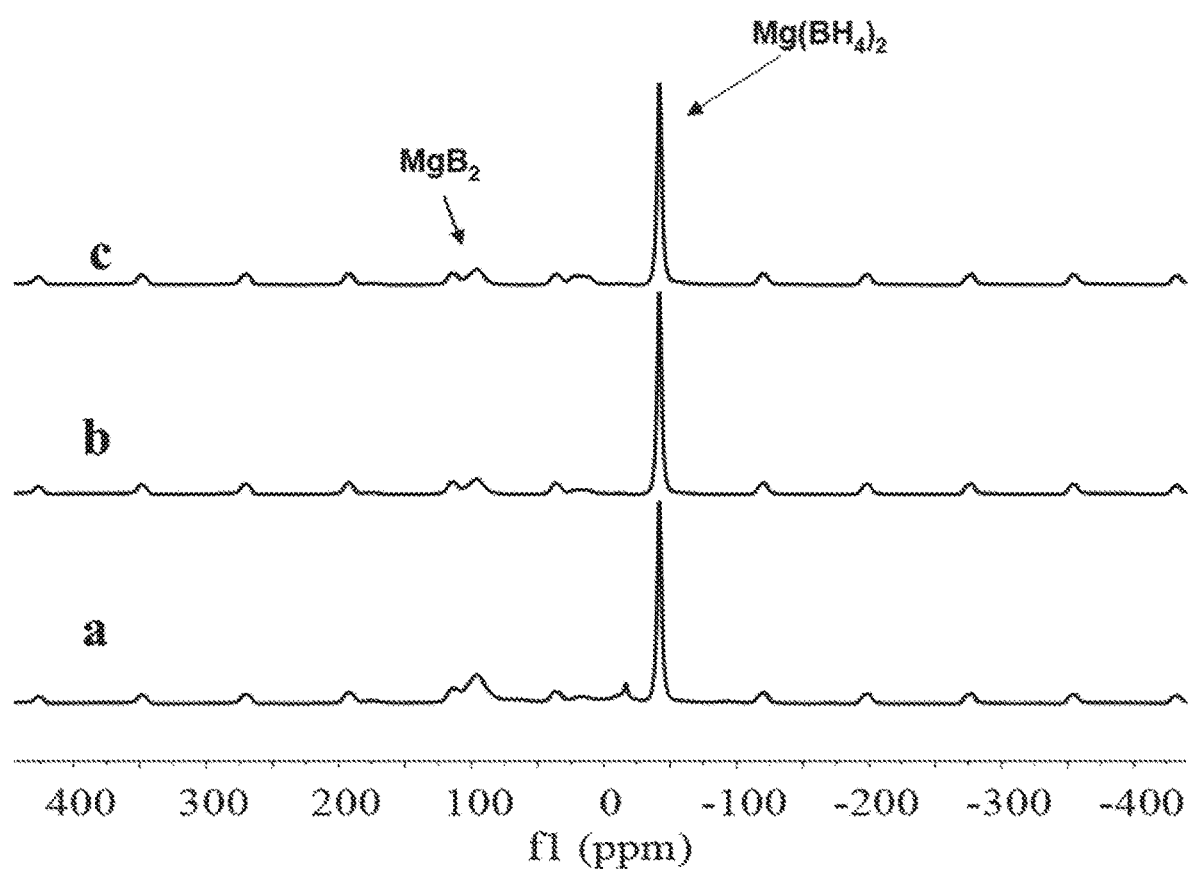

FIG. 4 illustrates $^{11}B$ solid state NMR. (a)—is $MgB_2$ modified with THF and 5 mol % Mg; (b)—is $MgB_2$ modified with THF and 40 mol % Mg; and (c)—is $MgB_2$ modified with 40 mol % $MgH_2$, hydrogenated at 700 bar, 300° C. and 72 hr.

Figure 5:
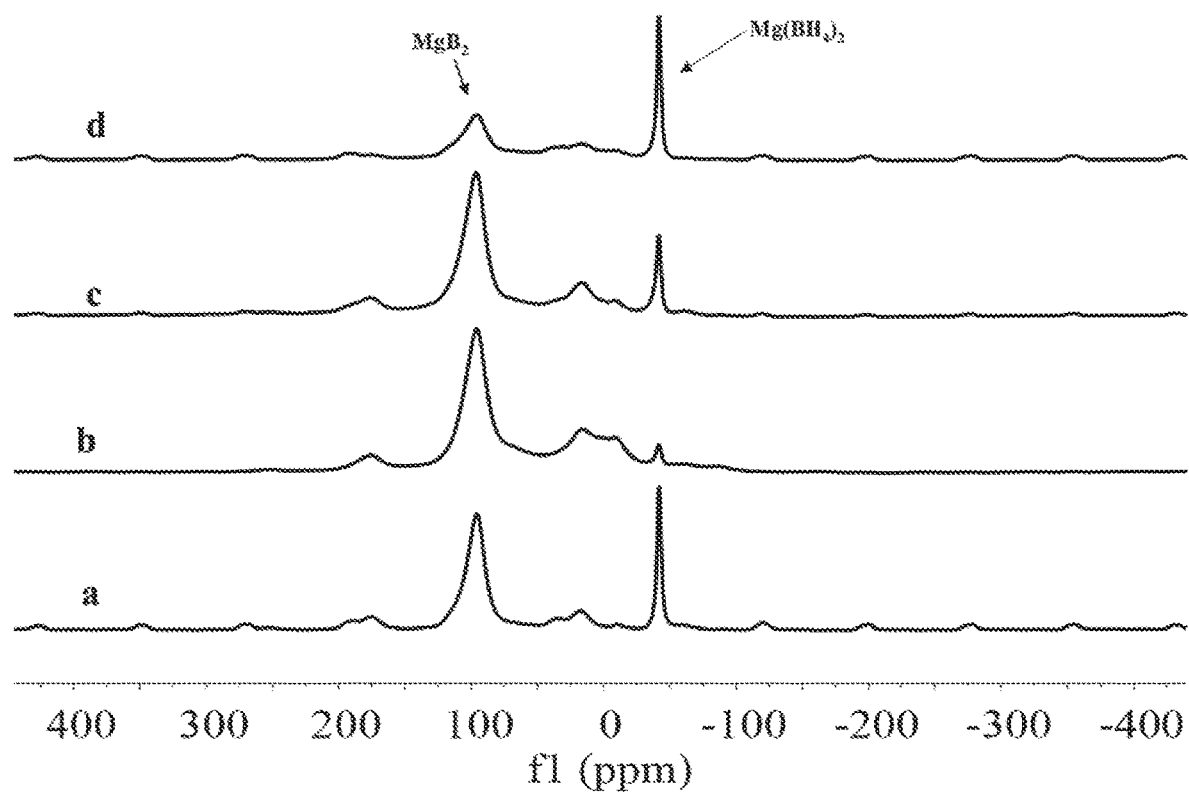

FIG. 5 illustrates $^{11}B$ solid state NMR of ball milled. (a)—is $MgB_2$ modified with THF and 10 mol % Mg; (b)—is $MgB_2$ modified with 10 mol % aluminum boride; (c)—is $MgB_2$ modified with 10 mol % anthracene; and (d)—is $MgB_2$ modified with 10 mol % graphene; hydrogenated at 400 bar, 300° C. and 72 hr.

Figure 6:
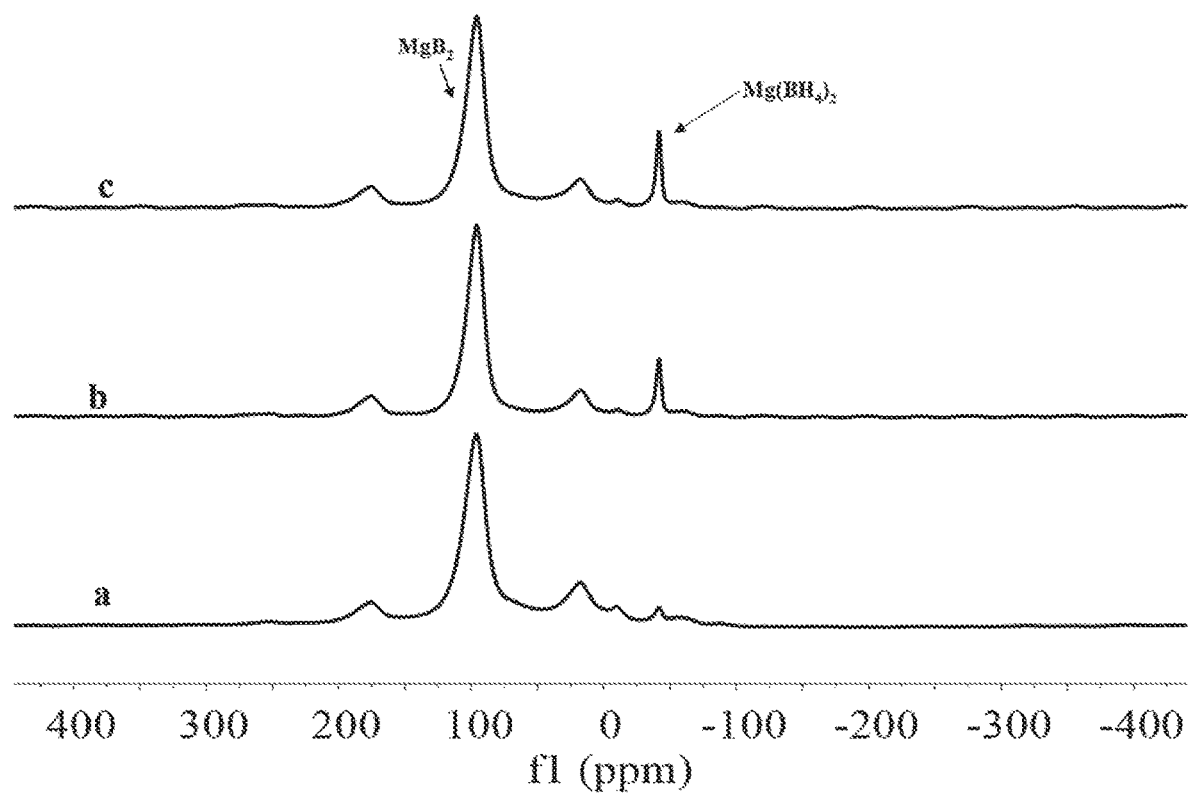

FIG. 6 illustrates $^{11}B$ solid state NMR of ball milled. (a)—is $MgB_2$ modified with 10 mol % anthracene; (b)—is $MgB_2$ modified with 10 mol % $MgH_2$, and (c)—is $MgB_2$ modified with THF and 10 mol % Mg; hydrogenated at 200 bar, 200° C. and 72 hr.

DETAILED DESCRIPTION

Detailed Description of the Embodiments

Magnesium borohydride, $Mg(BFH_4)_2$, and activated or modified magnesium boride, $MgB_2$, are made according to the methods disclosed herein may be used in a number of different end-use application, e.g., as a fuel source.

While the methods disclosed herein describe synthesizing $Mg(BH_4)_2$, it is to be understood that such methods may also be used or adapted for making other metal borohydrides, such as calcium borohydride, and/or mixtures of metal borohydrides, depending on the particular end-use application and/or desired end-use application performance properties. Accordingly, the methods disclosed herein are understood to be useful for making different forms of magnesium borohydride, depending on the particular end-use applications and performance properties.

Example methods as disclosed herein comprise hydrogenation of $Mg(BH_4)_2$ from magnesium boride, $MgB_2$, at a lower temperature and/or pressure than previously possible. A low temperature and/or pressure process for the preparation of $Mg(BH_4)_2$ is represented by the following process of equations (1) and (2):

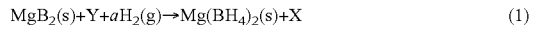

$$MgB_2(s)+Y+aH_2(g) \rightarrow Mg(BH_4)_2(s)+X \qquad (1)$$

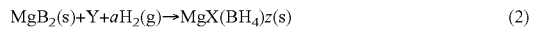

$$MgB_2(s)+Y+aH_2(g) \rightarrow MgX(BH_4)z(s) \qquad (2)$$

Where X=Y, or product or derivative of Y; a>0.5. In embodiments, Y may be the $MgB_2$ activating or modifying species. In further embodiments, Y may be a product or derivative of the activator or modifier to the $MgB_2$. In further embodiments, Y may also be formed in-situ during hydrogenation or during initial mixing with $MgB_2$. In further embodiments, Y may or may not be incorporated into the $MgB_2$. Equation 1 is written based on confirming explanatory data found in Examples as described herein.

In a particular embodiment of the invention, the synthesis of $Mg(BH_4)_2$ comprises mixing $MgB_2$ with a modifier to form a reaction mixture. In embodiments, a small amount of modifier is added to the reaction mixture which is then mixed under an inert atmosphere. In some instances, the $MgB_2$ was milled prior to the addition of the modifier. The mixing may be carried out at or near room temperature. After mixing, any extra liquid may be removed by rotary evaporation. The resulting product may be placed in a commercial stainless steel autoclave and exposed to high purity hydrogen gas under heat in attempts to hydrogenate the same.

In aspects, the $Mg(BH_4)_2$ synthesis may comprise a desired modifier. The modifier may be selected from a composition that improves hydrogenation of $MgB_2$ to $Mg(BH_4)_2$. In embodiments, the modifier may be a liquid or solid. In embodiments, the modifier may comprise a single material. In embodiments, the modifier may comprise an equimolar or non-equimolar mixture of one or more modifiers. Example modifiers may be selected from a hydride, a metal hydride, metal fluorides, liquid hydrogen carrier, ammonia borane, polycyclic aromatic hydrocarbons, arene, metal compounds or species, croconates, ethers, amines or imines, polymeric $S_xN_y$, or $B_xN_y$ type materials, metal carbides, metal borides such as aluminum or calcium boride, ionic liquids, Lewis bases, hydrogen species generating or donating compounds, Grignard reagents, Grignard-type chemicals, rieke metals, metals, and 2D and 3D materials such as graphene, and graphene oxide or graphite, or any combination of these materials. Examples of metal fluorides may comprise $CaF_2$, $ZnF_2$, $TiF_3$, and $NbF_4$, or any combination thereof. Example metal hydrides may comprise $VH_2$ and $MgH_2$, or any combination thereof. Example metal compounds or species may comprise $Mg_2Ni$, $Mg_2Cu$, $Mg_2Si$, $Mg_2Al_3$, $Mg_2Fe$, Mg, Na, $AlB_2$, Pt, $TiCl_3$, $TiO_2$, $ScCl_3$, $NbCl_5$, Ti—Nb nanocomposite, $AB_2$ type materials, and $AB_5$ type materials, and any combination thereof. Example ethers may include tetrahydrofuran and glymes, or any combination thereof. Examples of polycyclic aromatic hydrocarbons may comprise acenaphthene, acenaphthylene, anthracene, phenanthrene, tetracene, chrysene, fluoranthene, fluorine, naphthalene, triphenylene, pyrene, pentacene, benzo[a]pyrene, corannulene, benzo[ghi]perylene, coronene, ovalene, and benzo[c]fluorine, 2D and 3D-layered structures such as graphene, graphene oxide and graphite, and any combination thereof.

In embodiments, the modifier may comprise less than about 60 weight percent of the weight of the $MgB_2$ mixture. In embodiments, the modifier may comprise less than about 50 weight percent of the weight of the $MgB_2$ mixture. In embodiments, the modifier may comprise less than about 20 weight percent of the weight of the $MgB_2$ mixture. In embodiments, the modifier may comprise less than about 10 weight percent of the weight of the $MgB_2$ mixture. In embodiments, the modifier may comprise less than about three times the moles of the $MgB_2$ mixture. In embodiments, the modifier may comprise less than about two times the moles of the $MgB_2$ mixture. In embodiments, the modifier may comprise less than about one times the moles of the $MgB_2$ mixture.

In aspects, the $MgB_2$ containing a modifier may be made in-situ. In embodiments, the $MgB_2$ may be made from Mg+2B. In embodiments, the reactants may be made from magnesium boride/borane compounds and a metal hydride. In embodiments, the reactants may be made from $MgB_2$ compounds. In embodiments, the reactants are made from magnesium and/or boron containing compounds.

In aspects, an optimized ratio of modifier to boride may result in lower hydrogenation temperature and/or pressure. In embodiments, the optimized ratio of modifier to boride may improve hydrogen storage properties of magnesium boride/magnesium borohydride systems. In embodiments, the modifier may improve the magnesium boride product with enhanced properties for application in other hydrogen storage systems. For example, an application may include mixed boride-hydride system, boride-hydride integrated fuel cell, electrochemical reversible hydrogen storage, application in electronic devices, natural gas or methane activation/decomposition, water splitting, and/or magnesium borohydride formation from water.

In aspects, the synthesizing of $Mg(BH_4)_2$ from $MgB_2$ with one or more modifiers may reduce the hydrogenation temperature and/or pressure necessary to synthesize $Mg(BH_4)_2$ from $MgB_2$. In embodiments, the temperature for the hydrogenation reaction is at or below about 350° C. In embodiments, the temperature for the hydrogenation reaction is at or below about 300° C. In embodiments, the temperature of the hydrogenation reaction is at or below about 200° C. In embodiments, the temperature for the hydrogenation reaction is between about 200° C. and about 30° C. In embodiments, the temperature of the hydrogenation reaction is between about 250° C. and about 300° C. In embodiments, the temperature of the hydrogenation reaction is between about 250° C. and about 350° C. In embodiments, the temperature of the hydrogenation reaction is between about 75° C. and about 250° C. In embodiments, the temperature of the hydrogenation reaction is below about 75° C. In embodiments, the pressure of the hydrogenation reaction is at or below about 1000 bar. In embodiments, the pressure of the hydrogenation reaction is at or below about 700 bar. In embodiments, the pressure of the hydrogenation reaction is at below about 400 bar. In embodiments, the pressure of the hydrogenation reaction is between about 300 bar and about 1000 bar. In embodiments, the pressure of the hydrogenation reaction is between about 300 bar and about 700 bar. In embodiments, the pressure of the hydrogenation reaction is between about 400 bar and about 700 bar. In embodiments, the pressure of the hydrogenation reaction is between about 100 bar and about 300 bar. In embodiments, the pressure of the hydrogenation reaction is between about 10 bar and about 100 bar. In embodiments, the pressure of the hydrogenation reaction is below about 10 bar.

In aspects, the synthesizing of $Mg(BH_4)_2$ from modified $MgB_2$ may further include a liquid. In embodiments, various liquids including aprotic solvents and molten salts such as ionic liquids may be utilized. For example, aprotic solvents may include tetrahydrofuran (THF) and dimethoxyethane (DME), and combinations thereof. Other examples of aprotic solvents include: dioxane, triethyl amine, diisopropyl ether, diethyl ether, (-butyl methyl ether, 1,2-dimethoxyethane (glyme), 2-methoxyethyl ether (diglyme), tetraglyme, and polyethylene glycol dimethyl ether, and combinations thereof. Typical ionic liquid cations include, but are not limited to, mono-, di-, tri-, and tetra substituted ammonium; mono-, di-, tri-, and tetra substituted phosphonium, N-alkylpyridinium, 1,3-disubstituted pyridiniums, 1,4-disubstituted pyridiniums, 1,3-disubstituted imidazolium, 1,2,3-trisubstituted imidazolium, 1,1 disubstituted pyrrolidiums, trialkylsulfonium, and trialkyloxonium cations, and combinations thereof.

In aspects, the synthesizing of $Mg(BH_4)_2$ from modified $MgB_2$ may further include mechanical mixing. Not to be hound by theory, the disruption of the magnesium boride bonds during high energy mechanical milling is anticipated to create electron deficient or rich reactive sites, allowing for an instantaneous reaction and/or binding of sub stoichiometric amounts of modifier or modifier derived species. The incorporation or binding of sub-stoichiometric amounts of modifier or modifier derived species to magnesium boride is believed to be important to maintenance of high gravimetric and volumetric hydrogen densities in the modified $MgB_2$ system. The mechanical mixing may be used to aid in process of mixing $MgB_2$ with a desired modifier. In embodiments, the mechanical mixing is performed with dry or wet powders. In embodiments, the mechanical mixing may be performed with or without a liquid or multiple liquids. In embodiments, the mechanical mixing may be conducted under an inert atmosphere. For example, an inert atmosphere may include inert gases. Inert gases may include helium, neon, argon, krypton, xenon, radon, and nitrogen. In embodiments, combinations of inert gases may provide an inert atmosphere.

In embodiments, mechanical mixing may include ball milling. For ball milling, inert balls are generally preferred. Exemplary ball mills are rolling or planetary ball mills. In embodiments, the ball mill may rotate around a horizontal axis, a vertical axis, or an axis inclined between the horizontal and the vertical, partially filled with the material to be ground in addition to the grinding medium. An internal cascading effect reduces the reactants to a fine powder during the process. The amount and size of balls, as well as size of the vessel, are selected to provide effective grinding of insoluble solids during the reaction. Rolling or planetary ball mills can be used for this purpose. The total time for mechanical mixing depends upon the ratio of volume of grinding balls to the volume of solid reactants that are being reacted, and the speed of the ball mill rotation. In embodiments, the mechanical mixing may be up to 20 hours, up to 9 hours, up to 6 hours, up to 5 hours, up to 4 hours, up to 3 hours, up to 2 hours, up to 1 hour, less than 1 hour or less than 15 min.

In aspects, the synthesizing of $Mg(BH_4)_2$ from modified $MgB_2$ may further include sonication. Sonication may be used to aid in the process of mixing the reaction or interaction of $MgB_2$ with an modifier. In embodiments, the sonication is performed with wet powders. For example, with or without a liquid or multiple liquids. In embodiments, sonication may be conducted under an inert atmosphere. In embodiments, sonication may be up 48 hours, up to 24 hours, up to 12 hours, up to 1 hour or less than 15 min. Sonication time may be depended on volume of materials and liquid used, sonication power, sonication speed, sonication electrical energy to mechanical vibration to the sonicator probe, or vibrational shock waves through the materials.

In aspects, the synthesizing of $Mg(BH_4)_2$ from modified $MgB_2$ may further include thermally treating the magnesium boride materials with or without a modifier. Thermal treatment may be used to aid in the process of mixing the reaction of $MgB_2$ with an modifier. In embodiments, the modifier is added prior to or during hydrogenation. In embodiments, the thermal treatment is performed with dry or wet powders. For example, with or without a solvent or multiple solvents. In embodiments, the thermal treatment may be under an inert atmosphere. In embodiments, thermal treatment may be up to about 100° C., below about 100° C., between about 100-300° C., between about 300-600° C., or between about 600-1000° C.

In aspects, the mechanical mixing, sonication, and thermal treatment may comprise a single process. In embodiments, the mechanical mixing, sonication, and thermal treatment may comprise a combination process. In embodiments, the combination process may further comprise an additional step, at least one of, ball milling, plate or impact grinding, blending, stirring, agitation, sonication, ultra-sonication or heat treatment.

In aspects, the hydrogenation of the modified $MgB_2$ to $Mg(BH_4)_2$ is less than about 104 hours. In embodiments, the hydrogenation of modified $MgB_2$ to $Mg(BH_4)_2$ is less than about 80 hours. In embodiments, the hydrogenation of modified $MgB_2$ to $Mg(BH_4)_2$ is less than about 72 hours. In embodiments, the hydrogenation of modified $MgB_2$ to $Mg(BH_4)_2$ is less than about 60 hours. In embodiments, the hydrogenation of modified $MgB_2$ to $Mg(BH_4)_2$ is less than about 24 hours. In embodiments, the hydrogenation of modified $MgB_2$ to $Mg(BH_4)_2$ is less than about 12 hours. In embodiments, the hydrogenation of modified $MgB_2$ to $Mg(BH_4)_2$ is less than about 2 hours. In embodiments, the hydrogenation of modified $MgB_2$ to $Mg(BH_4)_2$ is less than about 5 min.

In aspects, the hydrogenation of modified $MgB_2$ to $Mg(BH_4)_2$ results in greater than about 70% conversion to $Mg(BH_4)_2$. In embodiments, the hydrogenation of modified $MgB_2$ to $Mg(BH_4)_2$ results in greater than about 60% conversion to $Mg(BH_4)_2$. In embodiments, the hydrogenation of modified $MgB_2$ to $Mg(BH_4)_2$ results in greater than about 50% conversion to $Mg(BH_4)_2$. In embodiments, the hydrogenation of modified $MgB_2$ materials to $Mg(BH_4)_2$ results in greater than about 40% conversion to $Mg(BH_4)_2$. In embodiments, the hydrogenation of modified $MgB_2$ to $Mg(BH_4)_2$ results in less than about 25% conversion to $Mg(BH_4)_2$. In embodiments, the hydrogenation of modified $MgB_2$ to $Mg(BH_4)_2$ results in less than about 20% conversion to $Mg(BH_4)_2$. In embodiments, the hydrogenation of $MgB_2$ modified with THF and 40 mol % Mg ($MgB_2$-THF-40 mol % $MgH_2$) to $Mg(BH_4)_2$ results in greater than about 60% conversion to $Mg(BH_4)_2$. In embodiments, the hydrogenation of $MgB_2$ modified with 40 mol % $MgH_2$ ($MgB_2$-40 mol % $MgH_2$) to $Mg(BH_4)_2$ results in greater than about 60% conversion to $Mg(BH_4)_2$. In embodiments, the hydrogenation of $MgB_2$ modified with 5 mol % anthracene ($MgB_2$-5 mol % anthracene) to $Mg(BH_4)_2$ results in greater than about 10% conversion to $Mg(BH_4)_2$. In embodiments, the hydrogenation of $MgB_2$ modified with 10 mol % graphene ($MgB_2$-10 mol % graphene) to $Mg(BH_4)_2$ results in greater than about 20% conversion to $Mg(BH_4)_2$. In embodiments, the hydrogenation from $MgB_2$ to $Mg(BH_4)_2$ results in greater than about 20% conversion to $Mg(BH_4)_2$ at 400 bar and 300° C.

In aspects, the synthesizing of $Mg(BR_4)_2$ from modified $MgB_2$ provides hydrogen uptake of greater than about 4 wt % by the modified $MgB_2$ material at or below 300° C. and at or below 700 bar. In some embodiments, the synthesizing of $Mg(BH_4)_2$ from modified $MgB_2$ provides hydrogen uptake of greater than about 6 wt % by the modified $MgB_2$ material at or below 300° C. and at or below 700 bar. In some embodiments, the synthesizing of $Mg(BH_4)_2$ from modified $MgB_2$ provides hydrogen uptake of greater than about 7 wt % by the modified $MgB_2$ material at or below 300° C. and at or below 700 bar.

In aspects, a method for synthesizing magnesium borohydride from magnesium boride is described herein. The method comprises: hydrogenating a quantity of a reaction mixture comprising magnesium boride and a modifier to form magnesium borohydride; wherein the hydrogenating step is performed at a temperature at or below about 300° C. and at a hydrogen pressure at or below about 700 bar. In embodiments, the hydrogenation pressure is maintained for less than about 104 hours. In embodiments, the magnesium boride and the modifier or additive are mechanically mixed, sonicated or thermally treated prior to hydrogenation. In embodiments, the mechanical mixing, sonication, thermal treatment is performed with dry or wet powders. In embodiments, the mechanical mixing is in an inert environment. In embodiments, the reaction mixture is a dry powder. In embodiments, the reaction mixture further comprises a liquid. In embodiments, the method further comprises evaporating any excess liquid from the reaction mixture. In embodiments, the hydrogenation is performed at the temperature at or below about 200° C. In embodiments, the hydrogenation is performed at the hydrogen pressure at or below about 400 bar. In embodiments, the modifier comprises, at least one of, hydrides, liquid hydrogen carriers, ammonia borane, metal compounds, croconates, ethers, amines, imines, polycyclic aromatic hydrocarbons, THF, polymeric $S_xN_y$ or $B_xN_y$ type, metal carbides such as SiC and $CB_4$, borides of aluminum or calcium, ionic liquids, metals such as Mg, Al or Na, carbonaceous materials such as graphene, graphite, and carbon nanotubes, hydrogen donating compounds and combinations thereof. In embodiments, the modifier comprises less than about 60 weight percent of the reaction mixture.

In aspects, a method of producing magnesium borohydride capable of reversible hydrogenation is described herein. The method comprises: processing a mixture of a magnesium boride with a first modifier; adding a second modifier to form a reaction mixture; mixing the reaction mixture; hydrogenating said reaction mixture at or below about 300° C. and at or below about 700 bar to produce magnesium borohydride. In embodiments, the step of processing is carried out in an environment consisting essentially of nitrogen. In embodiments, the second modifier is anthracene. In embodiments, the step of mixing is by ball milling. In embodiments, the method further comprises evaporating any excess liquid from the reaction mixture. In embodiments, the hydrogenation process results in less than an 8% weight loss of magnesium borohydride.

In aspects, a method of charging magnesium boride is described herein. The method comprises: mixing magnesium boride with a modifier; milling the magnesium boride and the modifier; applying pressure and heat to the magnesium boride and modifier to form $Mg(BH_4)_2$; and using the $Mg(BH_4)_2$ in a hydrogen storage system. In embodiments, a method for the reversible storage of hydrogen based on magnesium boride is described herein. The method comprises having a cycling hydrogen charging pressure ≤400 atm and hydrogen charging/discharging temperature ≤300° C. In embodiments, the reversible storage of hydrogen based on magnesium boride may be modified and stores and releases hydrogen with a maintained hydrogen cycling capacity of ≥4.0 wt. %.

Example 1

Synthesis of Modified $MgB_2$

General reaction conditions. The synthesis of magnesium borohydride involved mixing less than 2 g of magnesium boride or magnesium boride precursor materials with a known quantity of a modifier. In some instances, organic liquids such as ethers or anthracene were additionally added to the mixtures. This was followed by either heat treatment of the mixtures in Parr reaction vessels to less than 450° C., ultra-sonication for less than 1 hour, or ball milling at 700 rpm for a total of ≤20 hours. In some instances, the magnesium boride was ball milled for up to 5 hours prior to mixing with the modifier. The milling was carried out at or near room temperature. After mixing, milling, sonication or thermal treatment, any free volatile liquid was removed by rotary evaporation. The resulting product, a modified $MgB_2$, was placed in a commercial stainless steel autoclave and treated with hydrogen under heat in attempts to hydrogenate the same.

Synthesis of modified magnesium boride. The syntheses of modified magnesium boride involved the reaction or interaction of the magnesium boride with at least one modifier. Modifiers used include organic chemicals, e.g., tetrahydrofuran and anthracene; metals, e.g., magnesium, sodium, aluminum; hydrides, e.g., lithium hydride and magnesium hydride; 2D materials, e.g., graphene; metal borides, e.g., aluminum boride; ionic liquids, e.g., [$C_2$mim][Ac]; Grignard type reagents, e.g., sodium naphathalide, using mechanochemistry, ultrasonication or heat treatment techniques.

Experiments were conducted in which 5, 10 or 40 mol % of a given modifier were mechanically milled with $MgB_2$, wider 1 atm of nitrogen for up to a total of 5 h at 400 or 700 rpm. In some instances tetrahydrofuran ("THF") was added as the only modifier or as second modifier of the $MgB_2$. In some instances the $MgB_2$ was treated with ethyl bromide, anthracene, and $TiCl_3$ in the presence of THF. This was followed by vacuum drying at 70° C. for 3 hours to remove any excess liquids. In some instances, the modified $MgB_2$ materials were highly activated as exemplified by the high pyrophoric nature of the modified $MgB_2$, materials when in contact with air. Especially the modified $MgB_2$ materials containing the THF or anthracene modifiers.

The synthesis of the modified $MgB_2$ from the direct reactions of $MgB_2$ with various ethers is described in equations (3) and (4):

$$MgB_2 + x(\text{ether}) \rightarrow MgB_2(R)_x, \quad (3)$$

$$Mg(B_3H_8)_2(\text{THF})_x + 2MgH_2 \rightarrow 3MgB_2(R)_y + 10H_2 \quad (4)$$

where R is an ether, ether derived species, THF, or THF derived species.

Synthesis of modified magnesium boride with additional modifiers. Initial experiments on improving hydrogen uptake of $MgB_2$-THF through use of metal hydride based additives 5 mol % Mg, 10 or 40 mol % $MgH_2$ and 40 mol % Mg) in presence of THF were performed. The metal hydride modifiers or additives improved the hydrogenation of $MgB_2$ without ethers and mechanical mixing of $MgB_2$. About 40 mol % Mg, 40 mol % $MgH_2$, or 25 mol % 5 mol % $TiCl_3$ were synthesized under similar reaction conditions of 400 rpm and 9 hr total milling time. Highly reactive $MgB_2$ based materials were targeted to be formed, Equation (5) and (6), in the syntheses process.

(5)

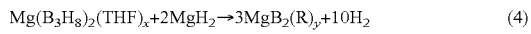

(6)

M = Mg, $MgH_2$ or LiH $MgB_2$-THF samples containing LiH were also prepared using the mechanical milling approach.

Ball milling syntheses reactions with other ethers. A similar approach to modified magnesium boride synthesis above was undertaken using ball milling approach with other ethers. Modified magnesium borides were formed by ball milling magnesium boride with THF, 1,4 dioxane, 1,3 dioxolane, tetraglyme and trialyme, Table 1. The synthesis was performed under various conditions including premilling magnesium boride followed by milling with ethers.

TABLE 1

Ball milling syntheses reaction conditions.

| Reactants | Pre-ether addition milling time (hrs) | Post-ether addition milling time (hrs) | Total Milling time (hrs) | Milling Rate (rpm) |
|---|---|---|---|---|
| $MgB_2$ and: | | | | |
| pure | 5 | 0 | 5 | |
| THF | 0 | 3 | 3 | 400 |
| THF | 0 | 4 | 4 | 400 |
| THF | 0 | 5 | 5 | 400 |
| THF | 0 | 6 | 6 | 400 |
| THF | 5 | 4 | 9 | 400 |
| 1,4 dioxane | 0 | 6 | 6 | 400 |
| 1,4 dioxane | 5 | 4 | 9 | 400 |
| 1,3 dioxolane | 0 | 6 | 6 | 400 |
| 1,3 dioxolane | 5 | 4 | 9 | 400 |
| Triglyme | 5 | 4 | 9 | 400 |
| Tetraglyme | 5 | 4 | 9 | 400 |

Results. The incorporation/binding of sub-stoichiometric amounts of ether species to $MgB_2$ may be important to the maintenance of high gravimetric and volumetric hydrogen densities in the modified $MgB_2$. The synthesis of the modified $MgB_2$ from the direct reactions of $MgB_2$ with various ethers is described in Table 2.

TABLE 2

Summary of modified $MgB_2$ synthesis reaction conditions.

| | Heat Treatment Syntheses | | Ball Milling Syntheses | |
|---|---|---|---|---|
| Reactants | Reaction Times (hrs) | Reaction Temp (° C.) | Milling rates (rpm) | Reaction times (hrs) |
| $MgB_2$ and: | | | | |
| Tetrahydrofuran (THF) | Up to 72 | 25-250 | 400 | 4-20 |
| 1,4 dioxane | 24 | 80-250 | 400 | 6-9 |
| 1,3 dioxolane | 24 | 80-250 | 400 | 6-9 |
| Triglyme | 24 | 250 | 400 | 9 |
| Tetralyme | 24 | 100-290 | 400 | 9 |
| $Mg(B_3H_8)_2(\text{THF})_x$ and: | | | | |
| THF + $MgH_2$ | 5-72 | 300-400 | | |

The pre-hydrogenated modified $MgB_2$ materials were characterized by $^{11}B$ or $^{1}H$ NMR, FTATR, TPD or XRD. The FTATR and solid state $^{1}H$ NMR spectra of the $MgB_2$ milled with THF modifier showed no spectroscopic indications of the incorporation of THF or the presence of any species in addition to the boride. X-ray diffraction analyses of the synthesized modified $MgB_2$ materials indicated a marked decrease in $MgB_2$ crystallinity that was attributed to the mechanical milling of the materials. A general broadening and decrease in the characteristic $MgB_2$ main reflections at 43° and 38° 2θ is observed in milled samples compared to un-milled pure $MgB_2$. Small reflections attributed to MgO were also observed at 43° and 62° in some samples. The infrared and solid state $^1H$ NMR spectra of the material obtained upon milling showed no spectroscopic indications of the incorporation of THF or the presence of any species in addition to the boride.

The direct synthesis of modified $MgB_2$ by mechanical milling of $MgB_2$ with ethers resulted in reduction in crystallinity of the $MgB_2$ phase, as evidenced by a reduction of $MgB_2$ peak intensity in X-ray diffraction spectra. No new phases attributable to the sub-stoichiometric quantities of coordinated ether species were observed in the diffraction pattern. Furthermore, negligible changes in resonance frequencies were observed in the $^{11}B$ solid state nuclear magnetic resonance of materials synthesized by mechanical milling process.

A similar trend was observed for products of modified $MgB_2$ syntheses by heat treatment of $MgB_2$ and ethers at temperatures below 300° C. The only exception was $MgB_2$-tetraglyme samples which showed new IR vibrations and a broad peak at ~20° 2θ in XRD spectra. Thermogravimetric analyses indicated significant mass loss of >15 wt % for the $MgB_2$-tetraglyme sample.

The syntheses attempts of modified $MgB_2$ through dehydrogenation of $Mg(B_3H_8)_2(THF)_2/MgH_2$ was performed around 390° C. for 24 hours followed by a second low temperature, heat treatment in presence of tetrahydrofuran. Characterization of the dehydrogenated product using $^{11}B$ Solution NMR in $D_2O$ indicated no soluble boron species confirming absence of water soluble magnesium borane species (e.g., $MgB_{12}H_{12}$). FTATR spectra showed no B—H stretches in 2100-2800 $cm^{-1}$ region confirming $^{11}B$ solution NMR results. TGA analyses showed mass loss of >40 wt %. The surprising absence of $MgB_{12}H_{12}$ below 400° C. points towards plausibility of pathways for forming $MgB_2$ at lower temperatures.

The mixing of LiH with $MgB_2$ resulted in new transitions or phase changes in DSC spectra at high temperatures pointing towards the possible incorporation or reaction of sub-stoichiometric amounts of LiH with the $MgB_2$.

The synthesized samples were characterized by XRD, FTATR and TPD-Mass spectroscopy. Four of the synthesized samples (9 hr ball milled $MgB_2$-THF+5 mol % LiH; 20 hr ball milled $MgB_2$-THF; 20 hr ball milled pure $MgB_2$ and pure 9 hr ball milled $MgB_2$) were tested for high pressure hydrogenation. XRD Rietveld analyses of the four samples indicated presence of Fe. The Fe contaminant is produced during the mechanical milling process and is a consequence of the high energy contact of the stainless steel balls and bowl. The percentage of Fe was determined to be higher in the THF containing samples compared to pure ball milled $MgB_2$ samples. However, the THF containing samples had the least intense $MgB_2$ peak intensities suggesting that a significant amount of the $MgB_2$ was amorphous and therefore not included in the calculations of the relative amount of iron in the samples.

The hydrogenation of the $MgB_2$-THF doped with 5 mol % LiH synthesized under milder conditions (9 hr ball milled vs 20 hr for $MgB_2$-THF) produced a hydride species playing a significant role in $MgB_2$ hydrogenation process. As a result, an increase of the quantity of the stable or metastable species formed during the mechano-chemical reactions of $MgB_2$ and THF. The holistic approach of the factors impacting the $MgB_2$ structure, such as the hydrogen uptake kinetics, provided an in-depth fundamental understanding on how the THF and/or THF derived species are perturbing the $MgB_2$ structure and causing vast improvements in hydrogenation kinetics.

Example 2

Hydrogenation of Modified $MgB_2$

The modified $MgB_2$ samples were each placed inside a stainless steel sample crucible in an argon glovebox. The sample crucibles were then placed inside an air tight auto clave sample reactor and taken outside the glovebox for high pressure hydrogenation. Hydrogenations were performed at various pressures (400-1000 bar) and temperatures (300-400° C.) for 24-72 hours. Following the hydrogenations, the sample reactors containing the hydrogenated materials were brought back into the glovebox. The hydrogenated modified $MgB_2$ materials were removed from the sample crucibles and placed in sealed glass vials, inside sealed aluminum bags for further analyses using XRD, $^{11}B$ solid state and solution NMR, TPD, TGA-DSC and FT-ATR.

The first hydrogenations consisted of modified $MgB_2$ materials, with single or combinatory modifiers: ethers only; Mg, $MgH_2$ or LiH in presence of THF, and LiH-5 mol % $TiCl_2$). These hydrogenations were performed between 700-1000 bar at 300° C. between 24-72 hours. Solid State $^{11}B$ NMR confirmed presence of $Mg(BH_4)_2$ in the hydrogenated samples. No $Mg(BH_4)_2$ was observed from pure ball milled $MgB_2$ hydrogenated at 700 bar and 300° C. The modified $MgB_2$ samples demonstrated hydrogen uptake at 300° C., 700 bar and 72 hours with about 7 wt % of the absorbed HT, released from a $MgB_2$-THF-40 mol % Mg material, Table 3 and FIG. 1. The amount of hydrogen released from the hydrogenated sample was confirmed using TPD-Mass Spec. Solid State $^{11}B$ NMR confirmed presence of $Mg(BH_4)_7$ in the hydrogenated samples. No $Mg(BH_4)_2$ was observed from pure ball milled $MgB_2$ hydrogenated at 700 bar and 300° C.

The second hydrogenations consisted of modified $MgB_2$ materials, with single modifiers: Mg, $MgH_2$ prepared in absence of tetrahydrofuran. These samples were hydrogenated at 700 bar, 300° C. and 72 hours. About 5% weight loss hydrogen was observed from a $MgB_2$-40 mol % $MgH_2$ material, FIG. 1. These result indicated plausibility of hydrides or other materials besides ethers being capable of modifying the $MgB_2$, to form a highly activated $MgB_2$ material that can be hydrogenated to $Mg(BH_4)_2$ at milder reaction conditions. Generally, the amount of hydrogen uptake (after adjusting for the $H_2$ released by the $MgH_2$ added to the reaction mixture or the $MgH_2$ formed by the hydrogenation of added excess Mg) was highly variable, depending upon the level of oxidation to oxides and borates that occurred during the high pressure hydrogenation procedure and/or reaction with residual $H_2O$ or air during TGA analyses. Temperature Programmed Desorption (TPD) studies, coupled with Mass Spectroscopy (Stanford Research Systems RGA 100 and custom made TPD16) analyses, were performed in the range of 1-50 amu on the samples of the reaction mixtures that were found to have undergone high levels of hydrogen uptake. These analyses verified that the evolved hydrogen contained only negligible, trace amounts of impurities, FIG. 2.

Characterization of the hydrogenated modified MgB$_2$ samples by $^{11}$B NMR confirmed hydrogen uptake by an ether-free MgB$_2$ based material at 300° C. and 700 bar. The presence of Mg(BH$_4$)$_2$ in hydrogenated samples was confirmed by observance of peaks at about −41 ppm in the $^{11}$B NMR spectra. About 5% weight loss hydrogen was observed from the modified MgB, milled with 40 mol % MgH$_2$. These result indicated plausibility of hydrides or other materials besides ethers being capable of destabilizing and/or modifying the MgB$_2$ structure, to form a highly activated MgB$_2$ material that can be hydrogenated to Mg(BH$_4$)$_2$ at milder reaction conditions.

In order to determine the extent of hydrogen uptake by the samples, thermogravimetric analyses of the hydrogenated materials (Instrument Q600 SDT) were carried out employing a temperature ramp of 5° C./min and argon flow of 100 ml/min up to 500-600° C. Subsequent dehydrogenation of the product obtained from the hydrogenation of MgB$_2$-THF at 700 bar and 300° C., was seen to release less than 1 wt % H. Thus our results suggest that the hydrogenation of MgB$_2$-THF without added MgH$_2$ or Mg at the milder conditions results in only surface hydrogenation. Much higher levels of hydrogen uptake were found to have occurred with samples of MgB$_2$-THF that were ball milled with the Mg or MgH$_2$, FIG. 1.

The products from the hydrogenation reactions were also analyzed by infrared vibration spectroscopy (FTATR). The spectra were obtained using Nicolet iS10 spectrometer with an attached diamond crystal accessory that allowed the spectra to be collected in an attenuated total reflectance (ATR) mode. As seen in FIG. 3, the spectra of the products obtained from the hydrogenation of MgB$_2$-40 mol % MgH$_2$ and MgB$_2$-THF-40 mol % Mg verify the formation of Mg(BH$_4$)$_2$, as the characteristic absorptions of borohydride are clearly present. The B—H stretches 2380 cm$^{-1}$ and 2280 cm$^{-1}$, the Mg—H stretch at 1380 cm$^{-1}$, and B—H bends at 1120 cm$^{-1}$ and 1260 cm$^{-1}$. The modified MgB$_2$ treated with 40 mol % MgH$_2$ also showed high conversion of MgB$_2$ to Mg(BH$_4$)$_2$ of 68%, which is close to that of Mg-THF modifier.

TABLE 3

TGA (mass loss %) and TPD-Mass spec (wt % H$_2$) of modified MgB$_2$ samples treated at 700 bar, 300° C., and 72 hr.

| Hydrogenated Sample | TGA wt loss (%) | TPD wt loss H$_2$ (%) |
|---|---|---|
| MgB$_2$—THF—40 mol % Mg | 6.3-7.2 | 7.3-8.1 |
| MgB$_2$—THF—40 mol % MgH$_2$ | 1.7 | — |
| MgB$_2$—0.3LiH—THF—5 mol % TiCl$_3$ | 2.5 | — |

More precise quantification of the level of conversion of MgB$_2$ to Mg(BH$_4$)$_2$ was accomplished by solid state $^{11}$B MAS NMR. FIG. 4 provides a comparison of the spectra obtained for the product mixtures resulting from samples of MgB$_2$-THF-5 mol % Mg, MgB$_2$-THF-40 mol % Mg and MgB$_2$-40 mol % MgH$_2$. The product spectra are dominated by a large peak at the −41 ppm chemical shift that is characteristic of Mg(BH$_4$)$_2$ and smaller, broad peak at 97 ppm due to residual MgB$_2$. The spectrum obtained for a standard 1:1:1:1 equimolar mixture of Mg(BH$_4$)$_2$, MgB$_2$, Na$_2$B$_{10}$H$_{10}$, and B(OH)$_3$ using the same pulse parameters showed that the signal response per boron atom was virtually identical for all 4 compounds. Thus on the basis of the integrated signal intensities in the spectrum of the MgB$_2$-THF-5% Mg product mixture, it can be estimated that 54% conversion to Mg(BH$_4$)$_2$ occurred. The products of hydrogenation of MgB$_2$-THF-40 mol %) Mg showed conversion to Mg(BH$_4$)$_2$ as high as 71%.

Direct quantification of the level of conversion of MgB$_2$ to Mg(BH$_4$)$_2$ was accomplished by solid state $^{11}$B MAS NMR using a Varian Innova 400 MHz spectrometer with a 32 mm HX CPMAS probe. The MgB$_2$-THF-5 mol % Mg product spectrum is dominated by a large peak at the −41 ppm chemical shift that is characteristic of Mg(BH$_4$)$_2$ and smaller, broad peak at 97 ppm due to residual MgB$_2$. NMR spectroscopy also revealed the presence of minor amounts of borate (32.9 ppm), boric acid (16.7 ppm) and an unknown borane (−16.7 ppm) species that were not detected by XRD. The spectrum obtained for a standard 1:1:1:1 equimolar mixture of Mg(BH$_4$)$_2$, MgB$_2$, Na$_2$B$_{10}$H$_{10}$, and B(OH)$_3$ using the same pulse parameters showed that the signal response per boron atom was virtually identical for all 4 compounds. Thus on the basis of the integrated signal intensities in the spectrum of the MgB$_2$-THF-5% Mg product mixture, it can be estimated that 54% conversion to Mg(BH$_4$)$_2$ occurred. Similar spectra were obtained for the products resulting from the hydrogenation of MgB$_2$-THF-40 mol % Mg and MgB$_2$-40 mol % MgH$_2$ which showed conversion to Mg(BH$_4$)$_2$ to be as high as 71% in the case of MgB2-THF-40 mol % Mg.

As previously observed above, the LiH containing samples showed relatively large amounts of B$_{12}$H$_{12}^{-2}$ (~−15 ppm) and B$_3$H$_8^-$ (~−30 ppm). It should be noted that no B$_{12}$H$_{12}^{-2}$ nor B$_3$H$_8^-$ was seen in the $^{11}$B NMR of MgB$_2$-THF 40 mol % Mg sample NMR.

Additional rounds hydrogenation. Additional hydrogenation runs were composed of MgB$_2$+M type samples (M=Mg, MgH$_2$ or LiH-5 mol % TiCl$_3$) prepared in absence of tetrahydrofuran. Characterization of the hydrogenated samples by $^{11}$B NMR confirmed hydrogen uptake by an ether-free MgB$_2$ based material at 300° C. and 700 bar. The presence of Mg(BH$_4$)$_2$ in hydrogenated samples was confirmed by observance of peaks at about −41 ppm in the $^{11}$B NMR spectra. About 5% weight loss hydrogen was observed from a MgB$_2$-40 mol % MgH$_2$ sample, Table 4. Since the pre hydrogenated sample had a weight loss of about 1.5 wt %, about 3.5 wt % of the mass loss can be attributable to high pressure hydrogenation of the MgB$_2$. These results indicate plausibility of hydrides or other materials besides ethers being capable of destabilizing MgB$_2$ structure, to form a highly activated MgB$_2$ material that can be hydrogenated to Mg(BH$_4$)$_2$, at milder reaction conditions.

TABLE 4

TGA (mass loss %) and TPD-Mass spec (wt % H$_2$) of MgB$_2$ ball milled with non-ether additives and hydrogenated at 700 bar, 300° C., and 72 hr.

| Hydrogenated Sample | TGA wt loss (%) | TPD wt loss H$_2$ (%) |
|---|---|---|
| MgB$_2$—40 mol % Mg | 5.3 | 5.2 |
| MgB$_2$—40 mol % MgH$_2$ | 3.3 | — |
| MgB$_2$ + 0.3LiH—5 mol % TiCl$_3$ | 2.5 | — |

Example 3

XRD Comparison of Desorbed Materials

About 50 mg each of hydrogenated samples (pre hydrogenation, post hydrogenation (700 bar, 300° C. and 72 hr), and after $H_2$ desorption of post hydrogenated sample, at 500° C.) were dehydrogenated for a total of 2 hours and isothermally at 500° C. for one hour plus a one hour ramp to 500° C. XRD analyses showed that the dehydrogenated $MgB_2$-THF-40 mol % Mg sample maintains similar characteristics to that of the pre-hydrogenated material. No crystalline $MgB_2$ peaks can be observed after dehydrogenation. This result indicates the maintenance of short range order in the samples, alluding to the potential for easy re-hydrogenation of materials at or below 300° C. and at or below 700 bar.

Example 4

Characterization of Hydrogenated Modified $MgB_2$ Materials

Synthesis of defected $MgB_2$ and $MgB_2$ composite materials. The introduction of defects in $MgB_2$ was performed using Bogdanovic method (Angew. Chem. Int. Ed. 19, 818 1981) for synthesis of activated $MgH_2$. Syntheses of $MgB_2$ composite materials was performed using mechanochemical method involving ball milling of $MgB_2$ in presence of additives. Treatment of $MgB_2$ with ethyl bromide, anthracene, and $TiCl_3$ in the presence of THF solvent. The dried product underwent high pressure hydrogenation at 400 bar and 300° C.

Further hydrogenations were performed at 400 bar and 300° C. for 72 hours using modified $MgB_2$ materials with 5 mol % or 10 mol % modifiers: $MgH_2$; Mg+THF; anthracene; graphene; sodium; sodium naphthalide; aluminum boride and aluminum. This work showed the potential to continuously improve the hydrogenation conditions of the modified $MgB_2$ by careful selection of modifiers. The hydrogenated modified $MgB_2$ materials were characterized using $^{11}B$ solid state NMR. Similarly, $Mg(BH_4)_2$ formation is observed in the modified $MgB_2$ samples hydrogenated under these conditions. The hydrogenated products spectrum is dominated by peaks at the −41 ppm chemical shift that is characteristic of $Mg(BH_4)_2$.

Example 5

Hydrogenations Below 700 Bar and 300° C.

Further hydrogenations were also performed below 700 bar and 300° C., for 72 hours using modified $MgB_2$ materials with 5 mol % or 10 mol % modifiers of $MgH_2$, Mg+THF, anthracene, graphene, sodium, sodium naphthalide, aluminum boride and aluminum. The modified $MgB_2$ materials were put in high temperature glass vials or stainless steel crucibles prior to placing the samples in a autoclave container, inside inert glovebox followed by hydrogenation outside the glovebox.

Results. The 400 bar and 300° C. hydrogenated modified $MgB_2$ samples were characterized using $^{11}B$ solid state NMR. $Mg(BH_4)_2$ formation (~−41 ppm) was again observed in the spectra of the modified $MgB_2$ samples hydrogenated under these conditions as seen in FIG. 5. The highest conversion of $MgB_2$ to $Mg(BH_4)_2$ was observed for samples of modified $MgB_2$ treated with 5 mol % anthracene, 10 mol % graphene and 10 mol % Mg+THF. These samples of modified $MgB_2$ indicated the potential to significantly hydrogenate bulk $MgB_2$ to $Mg(BH_4)_2$ at ≤400 bar and ≤300° C. The $^{11}B$ solid state MAS-NMR indicates $MgB_2$ to $Mg(BH_4)_2$ (−42 ppm) conversion of about 25% for the $MgB_2$ treated with 5 mol % anthracene. A negligible peak attributed to $MgB_{12}H_{12}$ is observed as a shoulder ~−17 ppm (<0.1%) and the unknown borane at −11 ppm. The percent conversion is based on boron content of $Mg(BH_4)_2$ (Mg $(BH_4)_2$ peak area versus the total boron content (total boron species peak area) in the spectra, as a percent ratio. All the boron peaks in the spectra are assumed to have originated from $MgB_2$.

An increased conversion of $MgB_2$ to $Mg(BH_4)_2$ of approx. 12% is observed with the sample of $MgB_2$ treated with 10 mol % Mg-2 mol % anthracene-THF. The amounts of anthracene and THF, as well as treatment procedure for this sample are similar to that of $MgB_2$ treated with 2 mol. % anthracene and THF (<5% conversion to $Mg(BH_4)_2$). This suggests that the improved $Mg(BH_4)_2$ content is due to the presence of Mg in the sample.

The modified $MgB_2$ materials with 10 mol % modifiers of $MgH_2$, Mg+THF or Anthracene, hydrogenated at 200 bar and 200° C., for 72 hours were characterized using $^{11}B$ solid state NMR. $Mg(BH_4)_2$ formation (~−41 ppm) was again observed in the spectra of the hydrogenated modified $MgB_2$ samples FIG. 6, further confirming the potential of continuously lowering the hydrogenation pressure and temperature of the $MgB_2$ hydrogenation by use of modifiers.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions detailed herein, it should be understood that other embodiments may be realized and that logical, chemical, and mechanical changes may be made without departing from the spirit and scope of the inventions. Thus, the detailed description herein is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step.

In describing the present disclosure, the following terminology will be used: The singular forms "a," "an," and "the" include plural referents unless the context clearly dictates otherwise. Thus, for example, reference to an item includes reference to one or more items. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be understood, however, that the detailed description and specific examples, while indicating exemplary embodiments, are given for purposes of illustration only and not of limitation. Many changes and modifications within the scope of the present disclosure may be made without departing from the spirit thereof, and the scope of this disclosure includes all such modifications. The corresponding structures, materials, acts, and equivalents of all elements in the claims below are intended to include any structure, material, or acts for performing the functions in combination with other claimed elements as specifically claimed. The scope should be determined by the appended claims and their legal equivalents, rather than by the examples given above. For example, the operations recited in any method claims may be executed in any order and are not limited to the order presented in the claims. Moreover, no element is essential unless specifically described herein as "critical" or "essential."

Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C be present in a single embodiment; for example, A and B, A and C, B and C, or A and B and C.

The invention claimed is:

1. A method of making hydrogen storage materials through modifications of magnesium boride, the method comprising milling magnesium boride in the presence of sub-stoichiometric amounts of a modifier that is at least one of an ether, arene, graphene, metal hydride, and a metal selected from the group consisting of aluminum, magnesium, and sodium, in an inert atmosphere.

2. The method of claim 1, wherein the ether is tetrahydrofuran.

3. The method of claim 1, wherein the arene is anthracene or phenanthrene.

4. The method of claim 1, wherein the metal hydride is magnesium hydride, and further comprising subjecting the milled magnesium boride to hydrogenation independent from the step of milling.

5. The method of claim 1, wherein the metal is magnesium.

6. A method for reversible storage of hydrogen based on magnesium boride which has been modified by the method of claim 1, which has a cycling hydrogen charging pressure ≤400 atm and hydrogen charging/discharging temperature ≤300° C.

7. A method for reversible storage of hydrogen based on magnesium boride that has been modified by the method of claim 1 which stores and releases hydrogen with a maintained hydrogen cycling capacity of ≥4.0 wt. %.

8. A method of powering a vehicle apparatus using hydrogenated magnesium boride, the method comprising:
    mechanically mixing magnesium boride in the presence of sub-stoichiometric amounts of a modifier that is at least one of an ether, arene, graphene, metal hydride, and metal selected from the group consisting of sodium, magnesium, and aluminum, in an inert atmosphere to form a modified magnesium boride material that is highly activated towards hydrogenation;
    hydrogenating the modified magnesium boride material by subjecting the modified magnesium boride material to hydrogen gas at a pressure of between 100 to 700 bar at a temperature of 75° C. to 300° C. to form magnesium borohydride that maintains a hydrogen cycling capacity of ≥4 wt %;
    controlling the release of hydrogen upon heating the magnesium borohydride in a hydrogen reservoir system; and
    powering a vehicle with the released hydrogen.

9. The method of claim 8, wherein the hydrogen cycling capacity is ≥7 wt %.

10. The method of claim 8, wherein the inert atmosphere comprises nitrogen or argon.

11. The method of claim 8, wherein the mechanical mixing is ball milling.

12. The method of claim 8, wherein the arene is anthracene or phenanthrene.

13. A method of synthesizing magnesium borohydride from magnesium boride, the method comprising:
    hydrogenating a quantity of a modified magnesium boride that is highly activated towards hydrogenation to form magnesium borohydride;
    wherein the modified magnesium boride is formed by mechanically mixing, sonication or thermal treatment of magnesium boride with a modifier; and
    wherein the hydrogenating step is performed after and independent of the step of forming the modified magnesium boride, and wherein the hydrogenating step is at a temperature between 75° C. and 300° C.

14. The method of claim 13, wherein the mechanical mixing is done by ball milling.

15. The method of claim 13, wherein the mechanical mixing is in an inert or non-inert environment.

16. The method of claim 13, further comprising evaporating excess liquid from the reaction mixture to ensure that the modifier content is below 60 weight percent.

17. The method of claim 13, wherein the hydrogenating step is performed at the temperature at or below about 200° C.

18. The method of claim 13, wherein the hydrogenating step is performed at a hydrogen pressure between 100 and 700 bar.

19. The method of claim 13, wherein the modifier comprises, at least one of, hydrides, liquid hydrogen carriers, ammonia borane, metal species, metal compounds, croconates, ethers, amines, imines, polycyclic aromatic hydrocarbons, THF, polymeric $S_xN_y$ or $B_xN_y$ type, metal carbides, borides of aluminum or calcium, ionic liquids, hydrogen donating compounds, 2D and 3D materials such as graphene, graphite and graphene oxide; Grignard type reagents, organometallic compounds, and combinations thereof.

* * * * *